US010680989B2

(12) United States Patent
Anders et al.

(10) Patent No.: US 10,680,989 B2
(45) Date of Patent: Jun. 9, 2020

(54) OPTIMAL TIMING OF DIGITAL CONTENT

(71) Applicant: INTERNATIONAL BUSINESS MACHINES CORPORATION, Armonk, NY (US)

(72) Inventors: Kelley Anders, East New Market, MD (US); Jeremy R. Fox, Georgetown, TX (US); Liam S. Harpur, Dublin (IE); Jonathan Dunne, Dungarvan (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 273 days.

(21) Appl. No.: 15/819,145

(22) Filed: Nov. 21, 2017

(65) Prior Publication Data

US 2019/0158448 A1   May 23, 2019

(51) Int. Cl.
*H04L 12/58* (2006.01)
*H04L 29/08* (2006.01)
(Continued)

(52) U.S. Cl.
CPC ............ *H04L 51/24* (2013.01); *G06F 40/205* (2020.01); *G06F 40/30* (2020.01); *H04L 51/12* (2013.01); *H04L 67/306* (2013.01)

(58) Field of Classification Search
CPC ............ G06F 17/2705; G06F 17/2785; G06F 16/289; G06F 17/241; G06F 19/325;
(Continued)

(56) References Cited

U.S. PATENT DOCUMENTS 4,670,905 A   6/1987   Sandvos et al.
5,532,680 A   7/1996   Ousborne
(Continued)

FOREIGN PATENT DOCUMENTS

WO   2016071659   5/2016

OTHER PUBLICATIONS

Bakker et al., "What's your current stress level? Detection of stress patterns from GSR sensor data", http://www.win.tue.nl/stressatwork/pdfs/stressdetection_hacdais11.pdf, Department of Computer Science Eindhoven University of Technology, The Netherlands, accessed Oct. 9, 2017, 8 pages.

(Continued)

*Primary Examiner* — Le H Luu
(74) *Attorney, Agent, or Firm* — Michael O'Keefe; Andrew D. Wright; Roberts Calderon Safran & Cole, P.C.

(57) ABSTRACT

Systems and methods for selectively delaying delivery of high-impact digital communications are disclosed. In embodiments, a computer-implemented method comprises: receiving, by a computing device, notification of a digital communication from a sender to at least one recipient; determining an impact value of the digital communication by comparing data of the digital communication with user profile data of the at least one recipient; determining that the impact value meets a predetermined threshold value associated with the at least one recipient, indicating that communication handling procedures apply to selectively delay the delivery of the digital communication to the at least one recipient; determining whether special delivery procedures apply that override the communication handling procedures; and initiating delivery of the digital communication to the at least one recipient based on the determining whether special delivery procedures apply.

20 Claims, 4 Drawing Sheets

(51) Int. Cl.
*G06F 40/30* (2020.01)
*G06F 40/205* (2020.01)

(58) Field of Classification Search
CPC ....... G06F 40/30; G06F 40/205; H04L 51/12; H04L 51/24; H04L 67/306; H04L 51/38; H04L 63/1416; G06Q 30/02; G09F 27/00
See application file for complete search history.

(56) References Cited

U.S. PATENT DOCUMENTS

| | | | | |
|---|---|---|---|---|
| 5,923,252 | A * | 7/1999 | Sizer | G09F 27/00 340/567 |
| 6,239,719 | B1 | 5/2001 | Hopkins | |
| 2003/0058277 | A1 * | 3/2003 | Bowman-Amuah | G06F 16/289 715/765 |
| 2005/0060643 | A1 * | 3/2005 | Glass | G06F 17/241 715/205 |
| 2007/0038705 | A1 | 2/2007 | Chickering et al. | |
| 2009/0172773 | A1 * | 7/2009 | Moore | G06F 19/325 726/1 |
| 2011/0289364 | A1 * | 11/2011 | Picklyk | H04L 51/38 714/49 |
| 2014/0040028 | A1 * | 2/2014 | King | G06Q 30/02 705/14.53 |
| 2015/0324352 | A1 | 11/2015 | Meyer et al. | |
| 2019/0007426 | A1 * | 1/2019 | Bergstrom | H04L 63/1416 |

OTHER PUBLICATIONS

Wulfsohn et al., "How to Visualize Email Sentiment with Python", https://indico.io/blog/email-sentiment/, Indico, Apr. 16, 2015, 4 pages.

DC Rainmaker, "A day of continuous heart rate monitoring", https://www.dcrainmaker.com/2012/12/a-day-of-continuous-heart-rate-monitoring.html, DC Rainmaker, Dec. 13, 2012, 16 pages.

Azarbarzin et al., "Relationship between arousal intensity and heart rate response to arousal", https://www.ncbi.nlm.nih.gov/pubmed/24899756, PubMed, Apr. 1, 2014, 1 page.

Leone et al., "The tell-tale heart: heart rate fluctuations index objective and subjective events during a game of chess", https://www.frontiersin.org/articles/10.3389/fnhum.2012.00273/full, Frontiers in Human Neuroscience, Oct. 8, 2012, 12 pages.

\* cited by examiner

OPTIMAL TIMING OF DIGITAL CONTENT

BACKGROUND

The present invention relates generally to the management of digital communications and, more particularly, to selectively delaying the delivery of stress-inducing digital communications.

In today's collaborative world, the type and amount of digital communications to which a particular person may be exposed on a daily basis has increased dramatically. While useful, digital communications can create additional stress in the lives of users, both because of content of the digital communications and because of the volume of the communications. Various systems have been developed to manage digital communications. Some systems have developed tools for analyzing the text of digital communications in order to generate alerts with respect to the digital communication, or to filter the digital communications by topic or context.

SUMMARY

In an aspect of the invention, a computer-implemented method includes: receiving, by a computing device, notification of a digital communication from a sender to at least one recipient; determining, by the computing device, a toxicity value of the digital communication by comparing data of the digital communication with user profile data of the at least one recipient; determining, by the computing device, that the toxicity value meets a predetermined threshold value associated with the at least one recipient, indicating that toxic communication handling procedures apply to selectively delay the delivery of the digital communication to the at least one recipient; determining, by the computing device, whether special delivery procedures apply that override the toxic communication handling procedures; and initiating, by the computing device, delivery of the digital communication to the at least one recipient based on the determining whether special delivery procedures apply.

In another aspect of the invention, there is a computer program product for selectively delaying delivery of stress-inducing digital communications. The computer program product comprises a computer readable storage medium having program instructions embodied therewith. The program instructions are executable by a computing device to cause the computing device to: receive a notification of a digital communication from a sender to a recipient; determine a toxicity value of the digital communication by comparing data of the digital communication with stress pattern data in a user profile of the recipient, wherein the stress pattern data is indicative of content determined to statistically increase a stress level of the recipient; determine that the toxicity value meets a predetermined threshold value associated with the recipient, indicating that toxic communication handling procedures apply to selectively delay the delivery of the digital communication to the recipient; and initiating delivery of the digital communication to the recipient in accordance with the toxic communication handling procedures based on a delayed delivery time.

In another aspect of the invention, there is a system for selectively delaying delivery of stress-inducing digital communications. The system includes a CPU, a computer readable memory and a computer readable storage medium associated with a computing device; program instructions to receive a digital communication from a sender to a recipient; program instructions to determine a toxicity value of the digital communication by comparing data of the digital communication with user profile data of the recipient; program instructions to determine that the toxicity value meets a predetermined threshold value associated with the recipient, indicating that toxic communication handling procedures apply to selectively delay the delivery of the digital communication to the recipient; program instructions to determine whether special delivery procedures apply that override the toxic communication handling procedures based on the user profile data of the recipient; and program instructions to make the digital communication available for viewing by the recipient based on the determining whether special deliver procedures apply, wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
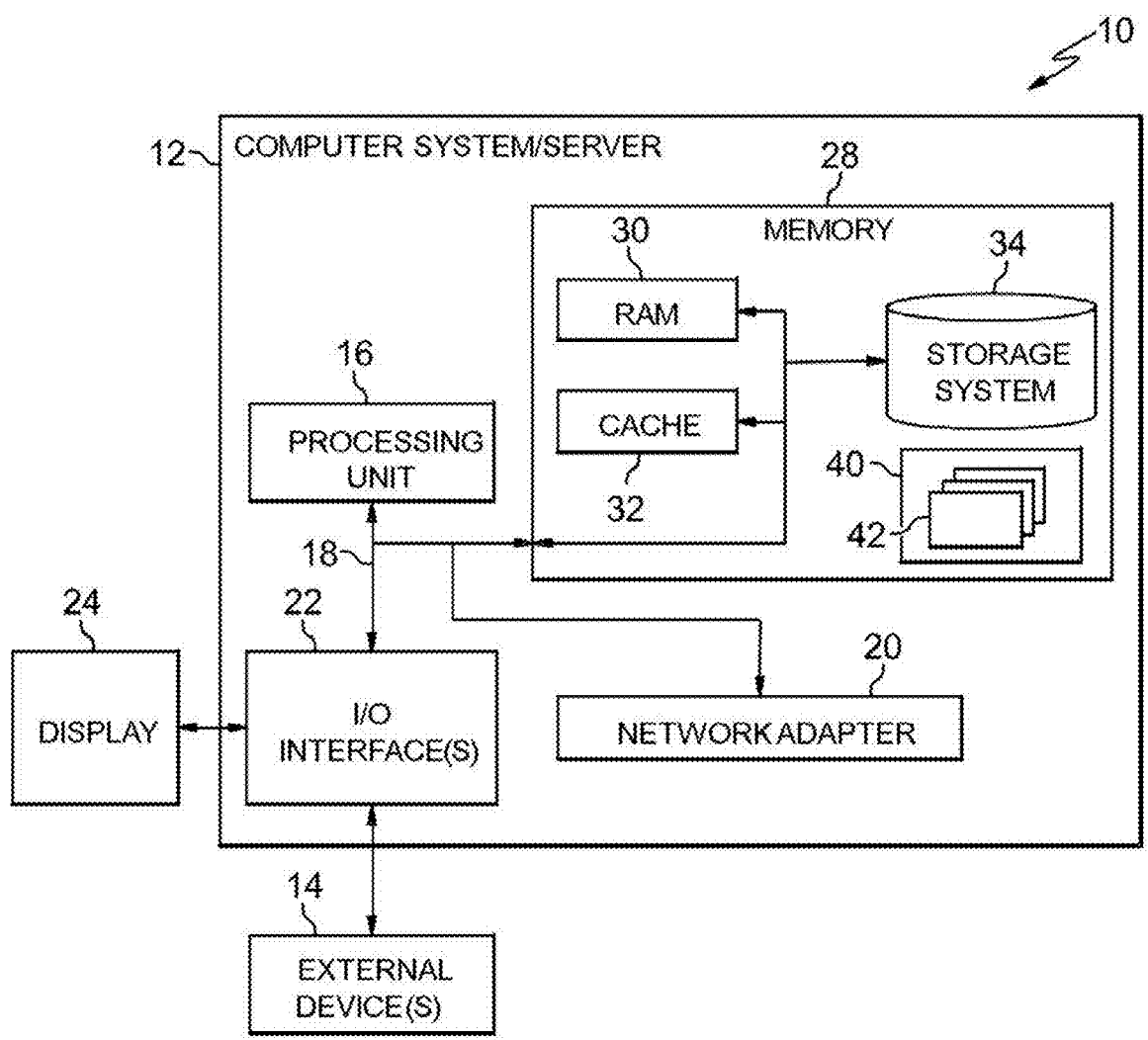
FIG. 1 depicts a computing infrastructure according to an embodiment of the present invention.

The present invention relates generally to the management of digital communications and, more particularly, to selectively delaying the delivery of stress-inducing digital communications. In embodiments, a system and method is provided for determining when content of a digital communication is likely to induce stress in a recipient (i.e., is a toxic communication) and selectively delaying the delivery of the digital communication to coordinate with the availability of one or more supportive contacts (i.e., promotors) of the recipient. The term promotor as used herein refers to a contact (e.g., colleague, friend, family member, etc.) of the user that has been determined to have a positive or stress-mitigating effect on the user (e.g., generally or related to a specific topic) based on contextual analysis of aggregate digital communications data and/or user profile data supplied by the user. Residual stress and negative emotions induced in a recipient by the receipt of a toxic digital communication will often be greater if the recipient has no one to communicate with regarding the content of the toxic digital communication. In aspects, a system ascertains when likely toxic content will be delivered to the recipient, and times the delivery of the likely toxic content so that a proximate or available promotor can help the recipient digest or make objective the likely toxic content.

In embodiments, a class model is utilized to determine a type and level of potential toxicity (e.g., negative emotive or stress content) of the content for a specific user/recipient. In aspects, electronic content of a digital communication is analyzed for topics and toxicity level (emotive/stress potential) for a specific user associated with the electronic content (e.g., a recipient of an email or text message). In embodiments, when the toxicity level meets or exceeds a threshold value associated with a recipient of the digital communication, a system selectively delays delivery of the digital communication to coincide with the availability of a promotor of the recipient.

Advantageously, embodiments of the present invention constitute improvements to the technical field of digital communications management by enabling delayed delivery of digital communications based on context data derived from historic digital communication and/or user data. Unlike existing digital communication methods which fall short of providing an adequate social network to support assimilation of adverse or toxic content, embodiments of the present invention provide a user access to an available social network during a time when they are likely to need that additional support (i.e., when exposed to toxic or stress-inducing digital communications). Accordingly, in embodiments, method steps of the present invention constitute unconventional digital communication management steps.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types.

Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
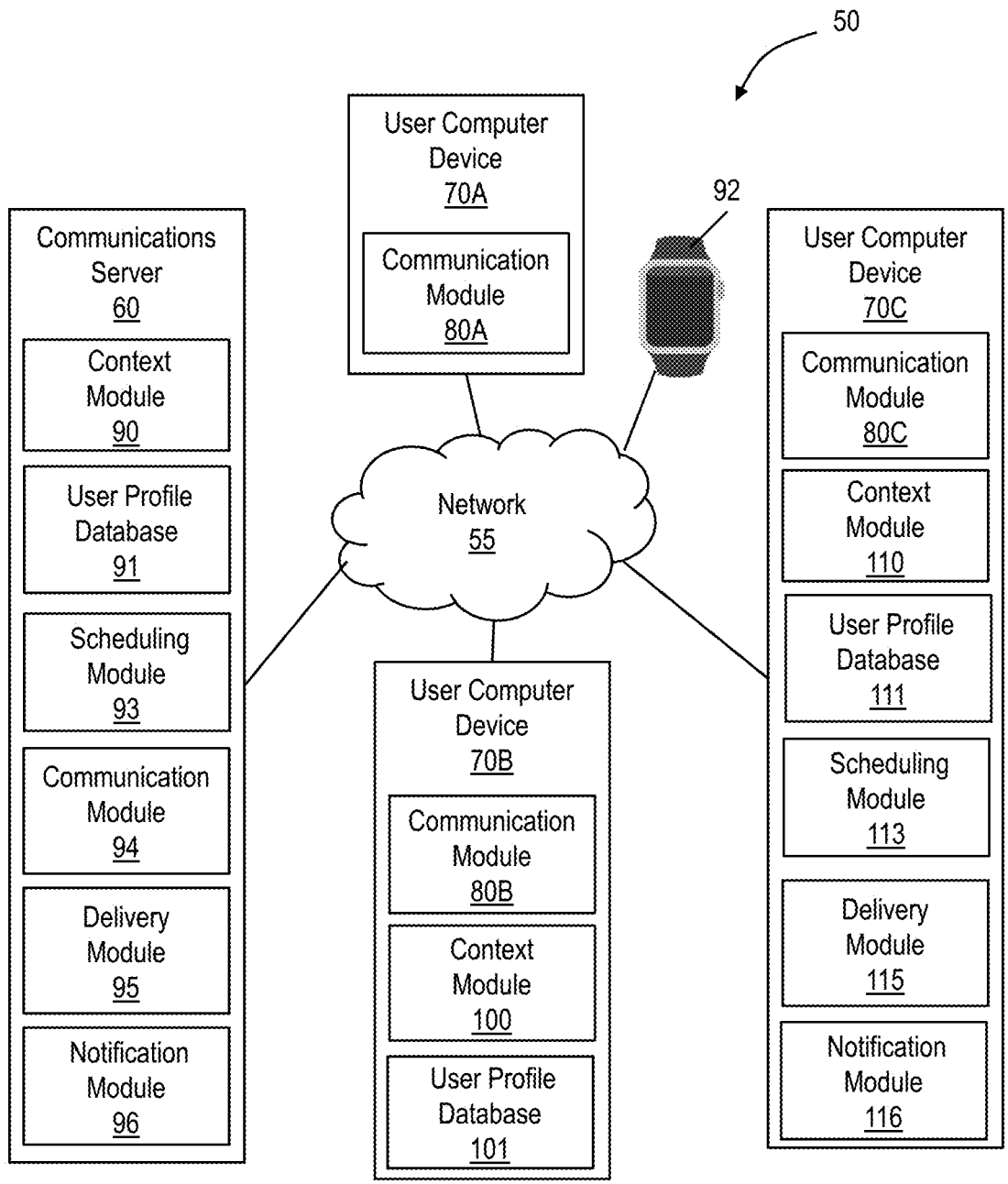
FIG. 2 shows an exemplary environment in accordance with aspects of the invention.

FIG. 2 shows an exemplary environment 50 in accordance with aspects of the invention. The environment 50 includes a network 55 connected to a communications server 60 and user computer devices 70A-70C. The communications server 60 may comprise a computer system 12 of FIG. 1, and may be connected to the network 55 via the network adapter 20 of FIG. 1. The communications server 60 may be configured as a special purpose computing device that is part of digital communications (e.g., email) infrastructure. For example, the communications server 60 may be part of an email server system configured to provide internet-based email services to a plurality of users.

The network 55 may be any suitable communication network or combination of networks, such as a local area network (LAN), a general wide area network (WAN), and/or a public network (e.g., the Internet). The user computer devices 70A-70C may be in the form of the computing device 12, and may be a desktop computer, laptop computer, tablet computer, smartphone, etc. In embodiments, each user computer device 70A-70B runs an application program through a respective communication module 80A-80B that provides an interface by which a user may enter digital communications data to be communicated to the communications server 60 via the network 55, and receive digital communications data from others via the network 55. In embodiments, the user computer device 70C runs an application program through a communication module 80C that provides an interface by which a user may enter digital communications data to be communicated to another user computer device (e.g., 70A-70B) via the network 55.

Still referring to FIG. 2, environment 50 may comprise a server-based solution approach wherein all decision making and digital communication delivery activities are controlled by server-based tasks. In order to implement this server-based approach, the communications server 60 may comprise one or more program modules (e.g., program module 42 of FIG. 1) configured to perform one or more of the functions described herein.

In embodiments, the communications server 60 includes a context module 90 configured to: determine stress patterns of a user based on context data (e.g., topic, sender, recipient) derived from aggregate digital communications of the user and user-derived stress data (when available); and save the stress patterns (stress pattern data) in a user profile database 91. In aspects, user-derived stress data includes biophysical data (e.g., heartrate data, etc.) obtained from a monitor, such as a wearable device 92 with heartrate monitoring capabilities. In aspects the context module 90 is further configured to generate a list of promotors and detractors associated with the user based on the stress pattern data of the user and user profile data from the user profile database 91.

The term promotor as used herein refers to contacts of the user (e.g., participants in the environment 50 including friends, colleagues, family, business contacts, etc.) who have been determined by the communications server 60 to provide a stress-mitigating or mood improving affect to the user, or have been identified by the user as a promotor (a person having a positive effect on the user's stress level or state of mind). The term detractor as used herein refers to contacts of the user (e.g., participants in the environment 50 including friends, colleagues, family, business contacts, etc.) who have been determined by the communications server 60 to worsen or exacerbate stress or negative feelings of the user, or have been identified by the user as a detractor (a person having a negative effect on the user's stress level or state of mind).

In aspects, the communications server 60 includes a scheduling module 93 configured to determine schedules of participants (e.g., senders and recipients of digital communications) of the environment 50, based on aggregate digital communications data of the participants and/or digital calendar data of the participants.

In embodiments, the communications server 60 includes a communication module 94 configured to interface with client-based communications applications of the communication modules 80A-80B, in order to coordinate the delivery of digital communications between remote user computer devices (e.g., 70A, 70B).

In aspects, the communications server 60 includes a delivery module 95 configured to determine toxicity values of digital communications received by the communication module 94 by comparing digital communication data (e.g., sender name, recipient name, content of email, etc.) with user profile data in the user profile database 91. As used herein, the term toxicity value refers to a quantifiable value indicative of an amount of stress, displeasure, or negative emotive or physical response for a particular user. For example, a digital communication including content associated with an elevated stress-response in the user, which is from a sender associated with an elevated stress-response in the user, may be assigned a high toxicity value of 8 on a scale of 1-10 by the delivery module 95.

In embodiments, the delivery module 95 is configured to determine if the toxicity value assigned to a digital communication meets a threshold value; determine whether special delivery procedures apply (e.g., override delivery delay triggered by a toxicity value); and determine a delayed delivery time (if a threshold value is met) based on schedule data of one or more promotors associated with the recipient of the digital communication.

In aspects, the communications server 60 includes a notification module 96 configured to generate notifications of delayed delivery and deliver the notifications to a sender whose digital commutation is subject to a delayed delivery time.

Still referring to FIG. 2, environment 50 may comprise a combined client-server-based solution approach wherein user profile preferences are stored locally on the client system (e.g., user computer device 70B), all user interface interactions are handled by the client system, and mail queueing decision making is handled on the server (e.g., communications server 60). In order to implement this client-server-based approach, the user computer device 70B may comprise one or more program modules (e.g., program module 42 of FIG. 1) configured to perform one or more of the functions described herein.

In embodiments, the user computer device 70B includes the communication module 80B for communicating with the communication module 94 of the communications server 60 and receiving digital communications data from one or more additional computing devices (e.g., user computer devices 70A and 70C) via the network 55.

In aspects, the user computer device 70B includes a context module 100 configured to: determine stress patterns of a user based on context data (e.g., topic, sender, recipient) derived from aggregate digital communications of the user and user-derived stress data (when available); and save the stress patterns (stress pattern data) in a user profile database 101. In aspects, user-derived stress data includes biophysical data (e.g., heartrate, etc.) obtained from a monitor, such as the wearable device 92 with heartrate monitoring capabilities. In aspects the context module 100 is further configured to generate a list of promotors and detractors associated with the user based on the stress pattern data of the user and user profile data from the user profile database 101.

Still referring to FIG. 2, environment 50 may comprise a client-based solution approach wherein the client system (e.g., user computer device 70C) selectively displays digital communications to a user. In order to implement this client-based approach, the user computer device 70C may comprise one or more program modules (e.g., program module 42 of FIG. 1) configured to perform one or more of the functions described herein.

In embodiments, the user computer device 70C includes the communication module 80C for communicating with one or more additional computer devices (e.g., user computer devices 70A and 70B and communications server 60) via the network 55. In aspects, the communication module 80C is configured to selectively delay the display or delivery of a digital communication to a user.

In aspects, the user computer device 70C includes a context module 110 configured to: determine stress patterns of a user based on context data (e.g., topic, sender, recipient) derived from aggregate digital communications of the user and user-derived stress data (when available); and save the stress patterns (stress pattern data) in a user profile database 111. In aspects, user-derived stress data includes biophysical data (e.g., heartrate, etc.) obtained from a monitor, such as the wearable device 92 with heartrate monitoring capabilities. In aspects the context module 110 is further configured to generate a list of promotors and detractors associated with the user based on the stress pattern data of the user and user profile data from the user profile database 111.

In aspects, the user computer device 70C includes a scheduling module 113 configured to determine schedules of participants (e.g., senders and recipients of digital communications), based on aggregate digital communications data of the participants and/or digital calendar data of the participants.

In aspects, the user computer device 70C includes a delivery module 115 configured to determine toxicity values of digital communications received by the communication module 80C by comparing digital communication data (e.g., sender name, recipient name, content of email, etc.) with user profile data in the user profile database 111. In embodiments, the delivery module 115 is configured to determine if the toxicity value assigned to a digital communication meets a threshold value; determine whether special delivery procedures apply (e.g., override delivery delay triggered by a toxicity value); and determine a delayed delivery time (if a threshold value is met) based on schedule data of one or more promotors associated with the recipient of the digital communication.

In aspects, the user computer device 70C includes a notification module 116 configured to generate notifications of delayed delivery and deliver the notifications to a sender whose digital commutation is subject to a delayed delivery time.

Embodiments of the invention require a user to "opt-in" to the data gathering steps required for the determination of stress patterns and schedules of users, wherein a user provides explicit permission for digital communication and/or calendar data gathering. Data gathering may be implemented in accordance with applicable privacy laws and may be discontinued at any time by a user who has revoked permission for data gathering steps of the present invention.

In embodiments, the communications server 60 and user computer devices 70A-70C may include additional or fewer components than those shown in FIG. 2. In embodiments, for each device, separate components may be integrated into a single computing component or module. Additionally, or alternatively, a single component may be implemented as multiple computing components or modules.

The quantity of devices and/or networks in the environment 50 is not limited to what is shown in FIG. 2. In practice, the environment 50 may include additional devices and/or networks; fewer devices and/or networks; different devices and/or networks; or differently arranged devices and/or networks than illustrated in FIG. 2. Also, in some implementations, one or more of the devices of the environment 50 may perform one or more functions described as being performed by another one or more of the devices of the environment 50. Devices of the environment 50 may interconnect via wired connections, wireless connections, or a combination of wired and wireless connections.

Figure 3:
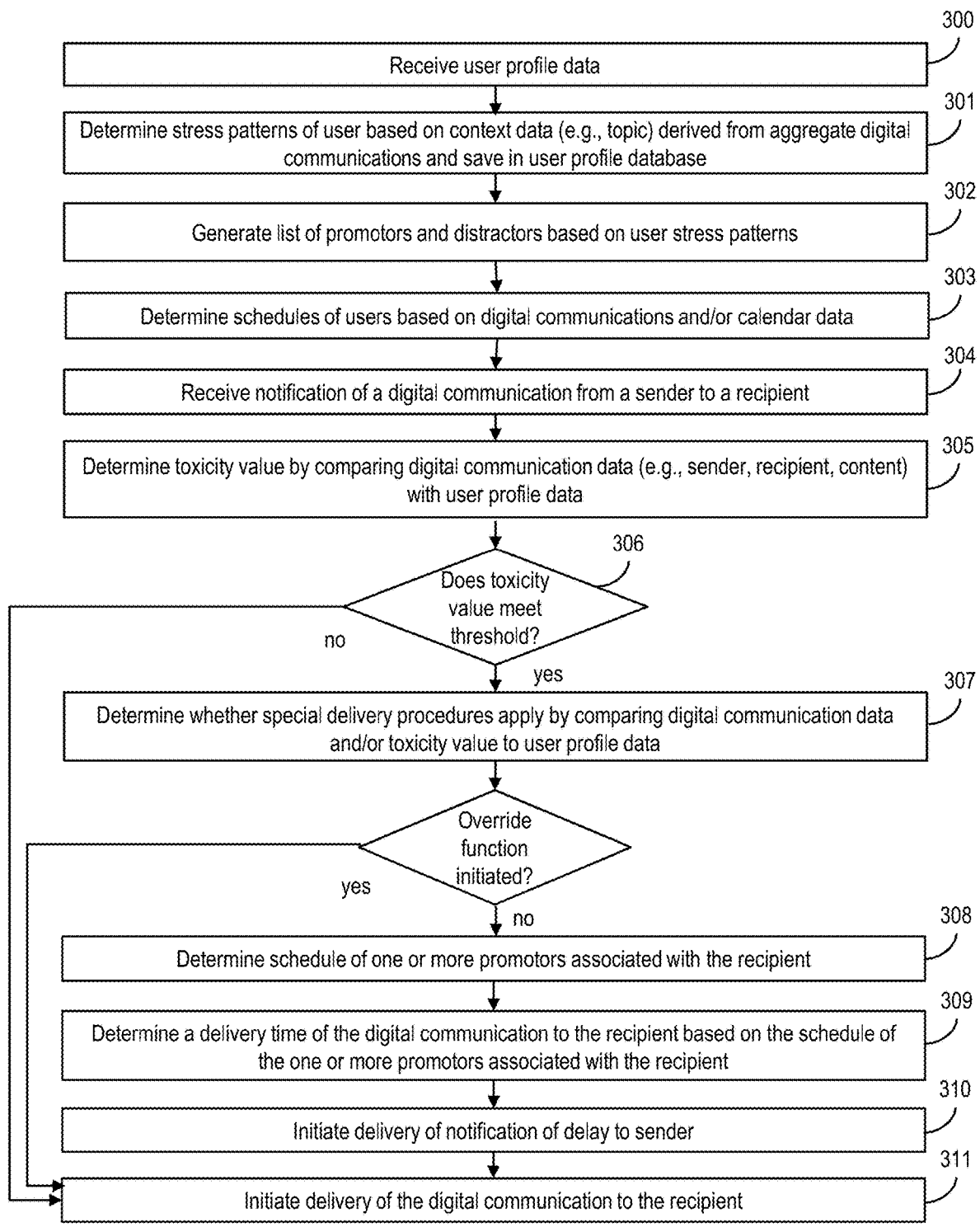
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2. In embodiments, steps of FIG. 3 are performed as a server-based solution approach. In alternative embodiments, steps of FIG. 3 are performed as a combined client-server-based solution approach.

At step 300, a computer device of the present invention receives user profile data. In server-based embodiments, the communications server 60 receives user profile data from one or more user computer devices 70A-70C over the network 55, and stores the user profile data in the user profile database 91. In combined client-server embodiments, a user computer device 70B receives user profile data from a user through a user interface and stores the user profile data in the user profile database 101. User profile data may include information regarding the user (name, address, etc.) and the user computer device (e.g., 70A-70C), as well as necessary data-gathering permissions. For example, the user may provide data enabling the context module 90 of the communications server 60 to access digital communications of the user (email, text-messaging, instant messaging, etc.), contact information for the user (friends, colleagues, email contact list, etc.), and/or wearable device data from a wearable device (e.g. the wearable device 92) of the user. User profile data may also include user selected options or rules; such as override rules discussed in more detail below with respect to step 307. In embodiments, user-configurable options enable a sender of a digital communication to orchestrate a response behavior pattern (e.g., only allow recipients to respond when promotor criteria are met), establish generic promotors, and assign promotors to specific topics.

At step 301, a computer device of the present invention determines stress patterns of a user based on context data derived from aggregate digital communications and saves the resulting stress pattern data in a user profile database, wherein the stress pattern data is indicative of content determined to statistically increase the user's stress level. In server-based embodiments, the context module 90 of the communications server 60 determines stress patterns of a user based on context data derived from aggregate digital communications of the user, and saves the resulting stress pattern data in the user profile database 91. In client-server embodiments, the context module 100 of the user computer device 70B determines stress patterns of a user based on context data derived from aggregate digital communications of the user, and saves the resulting stress pattern data in the user profile database 101. In aspects, the context module (90 or 100) derives a class model to determine a type and level of potential toxicity (e.g., negative emotive/stress content) of electronic content (digital communication content) for each user, utilizing contact information (e.g., colleague or friend information), by topic and stressor. In aspects, the class model is used to provide toxicity susceptibility data for individuals and/or groups by topic type.

It should be understood that a variety of methods may be utilized for determining stress patterns of a user in accordance with step 301. In aspects, sentiment analysis techniques are utilized to determine if digital communications include positive or negative content. In embodiments, the context modules 90, 100 may utilize natural language processing (NLP) to parse text of digital communications into different keywords and sentence fragments in order to statistically relate words and/or phrases to certain context or "ideas", and determine whether content of the digital communications include negative tones or phrases or positive tones or phrases. In aspects, the context modules 90, 100 are configured to determine one or more topics (e.g., a person, a place or a thing) of a digital communication, the sender of the digital communication, and the recipient of the digital communication, and assign a sentiment rating to the digital communication, recipient, sender and/or topic based on positive or negative content (e.g., text) of the digital communication.

Still referring to step 301 of FIG. 3, in one exemplary scenario, a context module (90 or 100) determines that an email from an Colleague A to an Colleague B regarding a Topic C includes numerous words or phrases associated with anger or stress, and thus assigns a negative sentiment rating to the Topic C. An accumulative analysis of multiple emails by the context module (90 or 100) reveals that emails from Colleague A regarding Topic C always have a negative sentiment rating. Accordingly, the context module (90 or 100) determines that Topic C should be assigned a high toxicity value for Colleague A, and saves the toxicity value associated with Topic C in Colleague A's user profile within the user profile database (91 or 101). In other words, stress patterns regarding Topic C determined by the context module (90, 100) indicate Topic C is a stress-inducing topic for Colleague A. In this scenario, the context module (90 or 100) determines that Colleague A often discusses (e.g., via an instant messaging tool) or forwards emails regarding Topic C to a Colleague D, and that these types of emails are associated with a decline in stress indicators (e.g., a decline in negative language) associated with Colleague A. In this example, Colleague D is helping Colleague A to calm down and de-stress after receiving an email on Topic C, as indicated by the cumulative analysis of Colleague A's digital communications (e.g., email and instant messages) by the context module (90 or 100) over time. Accordingly, the context module (90 or 100) associates Colleague D as having a positive effect on Colleague A regarding Topic C, and saves this stress pattern data in the user profile of Colleague A.

With continued reference to step 301 of FIG. 3, in embodiments, the context module (90 or 100) may associate biophysical data of the user with digital communications in order to determine when the digital communications elevate the user's stress level. For example, the context module (90 or 100) may gather heartrate data from the wearable device 92 of Colleague A within a particular time frame, and gather email data from emails of Colleague A on Topic C associated with the same time frame. In this scenario, the context module (90 or 100) recognizes that an increase in heartrate of the user is associated with the user accessing emails on Topic C for numerous digital communication, and determines that Topic C should be assigned a high toxicity level for Colleague A.

At step 302, a computer system of the present invention generates a list of promotors and detractors based on the user stress patterns determined at step 301. In server-based embodiments, the context module 90 of the communications server 60 generates a list of promotors and/or detractor associated with a user based on the stress pattern data determined at step 301, and saves this information in the user profile database 91. In client-server embodiments, the context module 100 of the user computer device 70B generates a list of promotors and/or detractors associated with a user based on the stress pattern data determined at step 301, and saves this information in the user profile database 101. In aspects, a computer system of the present invention learns the collaboration impact of a User A on a User B or Group C. In one example, Users A-C interact with a User D in a Group C chat session, in relation to a topic. In this scenario, User D is classified by the context module (90 or 100) as a statistically helpful friend (a promotor) in relation to a Topic C because positive emotion of the chat session as a whole increases by 49% on average with the contribution of User D to the chat session.

Still referring to step 302 of FIG. 3, in another example, the context module 90 may determine that Colleague D (discussed above with respect to step 301) is a promotor with respect to Topic C for Colleague A, based on stress pattern data gathered at step 301 indicating that Colleague D helps mitigate Colleague A's high stress level associated with Topic C. In one example, Topic C is a person (Colleague E) that context module 90 has determined causes Colleague A stress (e.g., Colleague E is assigned a high toxicity value by the context module 90). In this example, the context module 90 lists Colleague E as a detractor with respect to Colleague A, based on stress pattern data gathered at step 301 indicating that Colleague E induces stress and/or negative feelings in Colleague A.

In step 303, in server-based embodiments and client-server embodiments, the scheduling module 93 of the communications server 60 determines schedules of users based on digital communications and/or calendar data of the users. In embodiments, the communications server 60 has access to digital communications and calendar data of one or more users (e.g., the users of user computer devices 70A, 70B). Various methods of determining schedules may be utilized in the implementation of step 303. For example, scheduling module 93 may access scheduling data from a calendar of a user, a work schedule of a user, aggregated email data of a user, or other sources of scheduling information. In aspects, the scheduling module 93 uses NLP to determine scheduling patterns in one or more types of aggregate digital communication data (e.g., email, instant messaging tools, text messages, etc.). For example, the scheduling module 93 may determine that Colleague A is usually on-site at a work location (e.g., office) between the hours of 8:30 PM Eastern Standard Time (EST) and 4:30 PM EST based on time data associated with a plurality of emails sent by the user from their user computer (e.g., user computer device 70B).

At step 304, the communication module 94 of the communications server 60 receives notification of a digital communication from a sender to a recipient. Step 304 can be implemented utilizing a variety of digital communication methods and systems, such as email systems, instant messaging systems, text messaging systems, and the like.

At step 305, the delivery module 95 determines a total toxicity value of the digital communication of step 304 by comparing digital communication data of the digital communication with user profile data. In embodiments, the delivery module 95 uses NLP to parse the text of a digital communication, and analyses the digital communication for content (e.g., topics of the email) and emotive/stress potential to the recipient(s). In aspects, the delivery module 95 compares content (e.g., topics, including people, places or things) of the digital communication with topics in the recipient's profile to determine whether any content of the digital communication is associated with toxicity values in the recipient's profile. For example, if an email is sent from an Colleague B to an Colleague A regarding the Topics C and D, and Topics C and D have been determined at step 301 to cause Colleague A elevated stress, then the delivery module 95 may add the toxicity value associated with Topic C in the user's profile with the toxicity value associated with Topic D in the user's profile to obtain a total toxicity value for the digital communication with respect to Colleague A. In a second example, the delivery module 95 may determine that Colleague B is a detractor with respect to Colleague A, and may determine the total toxicity of the digital communication based on the sum of the toxicity values of Topics C and D, and Colleague B.

At step 306, the delivery module 95 compares the total toxicity value of the digital communication of step 305 with a threshold value. The threshold value may be a predetermined threshold value set by a user, by the communications server 60, or by a third party. The predetermined threshold value may be dynamic, and may increase or decrease from a base threshold value based on time of day, cumulative toxicity values of digital communications throughout the day, a current status of a user (e.g., the user's heartrate is already elevated based on wearable device data from the wearable device 92), or other factors affecting the user's ability to successfully process stressful information. If the delivery module 95 determines that the total toxicity value of the digital communications does not meet or exceed the threshold value at step 306, then the method proceeds to step 310, wherein the communication module 94 initiates delivery of the digital communication according to standard delivery times (i.e. delivery is not delayed). The term standard delivery time refers to a delivery time the digital communication would have been delivered but for any delay imposed by the delivery module 95. A threshold value may be generic (applied to multiple users), or may be customized for a particular user. If the delivery module 95 determines that the total toxicity value of the digital communications meets or exceeds the threshold value at step 306, then the method progresses to step 307.

At step 307, the delivery module 95 determines whether special delivery procedures apply if the digital communication meets or exceeds the threshold value at step 306. In aspects, the term special delivery procedures refers to any rule(s) that supersedes or overrides a default delivery rule. A default rule may be stated as "only receive content for a toxic topic whilst in the presence/proximity of a specified contact (e.g., colleague or friend) that is statistically able to mitigate the occurrence of negative emotion or stress (e.g., a promotor)". In embodiments, the delivery module 95 compares digital communication data (e.g., sender of email, recipient of email, topic of email), the total toxicity value, and/or one or more toxicity values associated with the digital communication to rules in the user profile database. Rules may be expressed within the digital communication data as metadata or the like. For example, a computing device of a user with authority to set override rules may embed metadata in a digital communication indicating that the digital communication should not be subject to any delivery delay. In aspects, one or more rules may be established by a user through a user interface of a user computer device (e.g., user computer device 70A). Rules may be established with respect to the recipient or sender of a digital communication. In aspects, user may have different authorizations to establish rules. Rules for use in embodiments of the invention may be established by digital communication senders, digital communication receivers, or administrators of the system (e.g., rules may be set by an organization). For example, an organization may create a rule specifying that all colleagues of a user who are at risk from symptoms of toxicity of a topic may only receive content on the topic when a promotor is available.

Still referring to step 307 of FIG. 3, in one example, a sender Colleague B has the highest authority to dictate rules (e.g., administrator, manager, etc.) and sets up a rule that email communications from them should never be delayed, but should be delivered immediately per standard email procedures. In this example, delivery module 95 may determine that a digital communication from Colleague B to Colleague A meets a threshold value for toxicity at step 306, but the rule of the sender Colleague B to always send his/her emails without delay overrides the default delivery rule (i.e., delay delivery until a promotor is available) associated with the toxicity determined at step 306. In another example, a sender of a digital communication User A needs a response by 11 AM but the support network (promotors) of the recipient User B is not available under 12 PM. In this situation, a rule may establish the delivery of the digital communication to other target users (e.g., User A cannot reach the project lead, so the digital communication is redirected to their manager User C).

In another example associated with step 307 of FIG. 3, a user may set up a rule that digital communication communications from another user identified as a detractor of the user should always be delivered immediately per standard digital communication procedures, and should never be delayed. When the delivery module 95 determines that a rule supersedes a toxicity value (e.g., overrides the delay function of delivery module 95), the delivery module 95 proceeds to step 310, wherein the communication module 94 initiates delivery of the digital communication according to standard delivery procedures. If the delivery module 95 determines that no rules in the user profile database 91 and/or expressed through content of the digital communication (e.g., metadata regarding a rule) supersede the toxicity value (e.g., no rules are identified that override the delay function of the delivery module 95), then the delivery module 95 proceeds to step 308.

At step 308, the delivery module 95 determines a schedule of one or more promotors associated with the recipient when the digital communication has met the threshold value at step 306, and no rules are identified that override the delay function of the delivery module 95 in accordance with step 307. In embodiments, the delivery module 95 accesses scheduling data in the user profile database 91 generated at step 303 by the scheduling module 93. In aspects, the scheduling data can be determined dynamically, based on continuously updated scheduling information saved in the user profile database 91 at step 303. In embodiments, the delivery module 95 performs an availability confirmation step to determine whether the promotor associated with the user is available, such as by determining if they have performed a digital communication operation (e.g., sent email, opened email, deleted email) within a predetermined time frame (e.g., within the last 10 minutes). In aspects, step 303 is performed in conjunction with step 308, and the scheduling module 93 is integrated with the delivery module 95.

At step 309, the delivery module 95 determines a delivery time or delivery window for delivering the digital communication to the recipient based on the availability of the one or more promotors in view of their schedules determined at step 308. Availability of the promotor may be determined based on general availability (e.g., data indicates the promotor is in his/her office, the promotor's schedule indicates they should be free, etc.) or based on the promotor's availability with respect the recipient of the digital communication (e.g., the promotor is currently online in a social media network or messaging tool accessible by the recipient). In embodiments, the delivery time determined by the delivery module 95 is a delayed delivery time (delay time) which is later than a standard delivery time. In embodiments, the delivery time is selected from one or more social network windows of time (one or more windows of time in which a promotor is available to support a user).

In embodiments, in the implementation of step 309 of FIG. 3, the delivery module 95 utilizes one or more arbitration rules to determine which of a plurality of possible digital communication delivery times or delivery windows to select for a group of recipients. In one example, an Colleague E is listed as a recipient for an email on Topic C that is also being sent to Colleague G (a manager), Colleague H and Colleague I. In this scenario, the email does not meet a toxicity threshold value with respect to Colleague E, but does meet threshold values for Colleagues G and H in accordance with step 306 of FIG. 3. The delivery module 95 determines different delivery times for each of Colleagues G and H at a first substep of step 309. In this scenario, possible "support network" delivery windows include between 10:00 AM-11:00 PM for Colleague G who is less prone to being stressed, and between 11:00 AM-12:00 PM for Colleague H who is more prone to being stressed, but has several promotors available whom they can consult to mitigate stress. In this scenario, an arbitration rule indicates that a recipient with the highest associated toxicity rating dictates the scheduling of the email to the entire group. In this case, the highest toxicity rating for the email is associated with Colleague H. Accordingly, in a second substep of step 309, the delivery module 95 determines that the delivery time for the email is between 11:00 AM-12:00 PM in accordance with the applicable arbitrations rules.

At step 310, the delivery module 95 generates and initiates delivery of a notification of delay to the sender of the digital communication, indicating that delivery of the sender's digital communication will be delayed. For example, the delivery module 95 may generate a notification to a sender telling the sender that their digital communication is scheduled to be delivered at 3:00 PM, which constitutes a 1-hour delay in delivery from the standard delivery time. In embodiments, the delivery module 95 generates a notification in accordance with saved notification rules, which may be established by digital communication senders, digital communication receivers or administrators (e.g., organizations). For example, rules may be established wherein senders of a digital communication will be notified that their digital communication will not arrive until a later time, or autonomic capabilities exist such that delay of delivery is implemented when certain stress patterns and emotional rules specified by the sender are true.

At step 311, the delivery module 95 initiates delivery of the digital communication to the recipient. If the total toxicity value of the digital communication does not meet a threshold value at step 306, or the delivery module 95 determines that a rules overrides the delay function of the delivery module 95 at step 307, then the digital communication is sent in accordance with standard delivery procedures based on a standard delivery time (e.g., standard email queuing procedures are utilized by the communications server 60). However, if the total toxicity value of the digital communication meets a threshold value at step 306, and no overriding rules apply in accordance with step 307, then the delivery module 95 causes the digital communications to be delivered to the recipient based on the delivery time determined at step 309. In embodiments, the delivery module 95 causes the digital communication to be delivered based on a delayed delivery time or delivery window (e.g., delayed 3 hours until a promotor of the recipient is available).

When the digital communication of step 304 is sent to more than one recipient, steps 305-311 of the present invention may be implemented on a user-by-user basis, or may be implemented utilizing group decision-making rules. In embodiments, when a digital communication is sent to more than one user, and more than one set of rules apply to the delivery of the digital communication, arbitration rules are applied by the communications server 60 to determine the handling/delivery of the digital communication to respective recipients. Moreover, an arbitration override rule may be established by an administrator to (1) receive, for each user in a group, an earliest possible delivery of the email, based on one recipient's qualification; (2) receive, for each user in a group, a latest possible delivery of the email, based on one recipient's qualification; or (3) receive, for each user in a group, delivery of the email in a window only when the window supports all recipients. When arbitration rules are applied, and a delivery module (e.g., 95, 115) determines a delivery time that differs from what a sender was told (e.g., the delivery time differs from a notification sent in accordance with step 312 of FIG. 3) a return receipt notification may be generated to alert the sender of the digital communication as to when the digital communication was received by the recipient.

An exemplary scenario will now be discussed with reference to the steps of FIG. 3. In accordance with step 301 of FIG. 3, a User A inputs profile data into a user computer device 70A, which communicates said user profile data to the communications server 60 for storage in the user profile database 91. In this example, User A sets up rules in his/her user profile regarding times that he/she would like "support network" benefits (i.e., times he/she wants a promotor to be available to User A to help assimilate/digest toxic content). In this scenario, digital communications and personal data from the wearable device 92 of the User A are monitored by the context module 90 for 6 months in accordance with step 302 of FIG. 3. Monitoring of biophysical data from the wearable device 92 and social activity (digital communications) enables the context module 90 to determine that: User A feels elevated stressed when content related to Topic X is received and additionally whenever a meeting on Topic X occurs. The monitoring of digital communication and personal data by the context module 90 enables the communications server 60 to understand network nodes that are used by User A to aerate (discuss) stressful situations, and enables the communications server 60 to understand the aggregate impact on User A of dealing with others in electronic communications. In this scenario, when User A interacts with User B in a Group C chat session, in relation to a Topic X, statistically User B is classified as a helpful friend because positive emotion of User A increases by 30% on average. Accordingly, the context module 90 determines that User B is a promotor with respect to Topic X for User A, in accordance with step 303 of FIG. 3.

With continued reference to FIG. 3, in this exemplary scenario, the communications server 60 receives a notification of an email from User C to User A regarding Topic X at 8:00 AM in accordance with step 305 of FIG. 3, and determines that the toxicity value of the email is an 8 on a scale of 1-10 based on stress pattern data collected by the context module 90, in accordance with step 306 of FIG. 3. In this scenario, a default toxicity threshold value is set at 7 on a scale of 1-10, and the delivery module 95 determines that the email meets the threshold value in accordance with step 307 of FIG. 3. The delivery module 95 further determines that no special delivery procedures apply in accordance with step 308 of FIG. 3. The delivery module 95 then determines the schedule or availability of User B, who is a recorded promotor of User A with respect to Topic X, in accordance with step 309 of FIG. 3. The delivery module 95 determines that User B has two availability windows, including a first window from 11:00 AM-12:00 PM and a second availability window from 1:00 PM-2:00 PM. According to default settings of User A indicating that the first available window should be chosen, the delivery module 95 determines a delivery time of the digital communication of 11:00 AM-12:00 PM based on the availability of User B, in accordance with step 310 of FIG. 3. In accordance with step 310 of FIG. 3, a notification is sent to the sender User C, indicating that the email will be delivered within the window of 11:00 AM-12:00 PM. In accordance with step 311 of FIG. 3, the communication module 94 then initiates delivery of the email to the User A within the window of 11:00 AM-12:00 PM.

Figure 4:
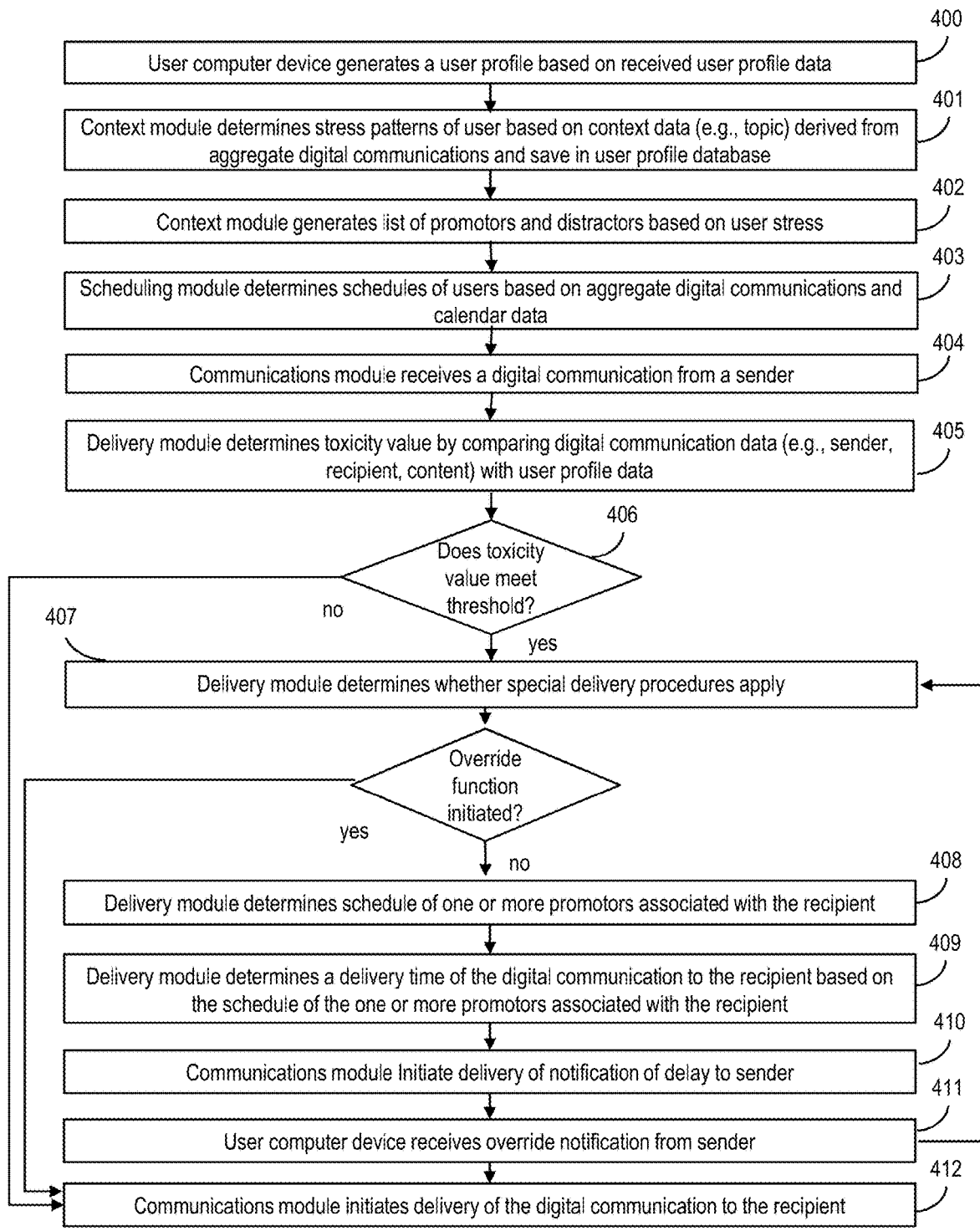
FIG. 4 shows a flowchart of steps of a method in accordance with additional aspects of the invention.

FIG. 4 shows a flowchart of a method in accordance with a client-based solution approach of the invention. Steps of the method of FIG. 4 may be performed in the environment illustrated in FIG. 2, and are described with reference to elements shown in FIG. 2.

At step 400, the user computer device 70C generates a user profile based on user profile data received from a user through a user interface, and stores the user profile data in the user profile database 111. Alternatively, the user computer device 70C may import user profile data and save the user profile data in the user profile database 111. User profile data may include information regarding the user (name, address, etc.) as well as necessary data-gathering permissions. For example, the user may provide data enabling the context module 110 of the user computer device 70C to access digital communications of the user (email, text-messaging, instant messaging, etc.), contact information for the user (friends, colleagues, email contact list, etc.), and/or wearable device data from a wearable device (e.g., wearable device 92) of the user. User profile data may also include user selected options such as override rules discussed in more detail below with respect to step 407.

At step 401, the context module 110 of the user computer device 70C determines stress patterns of a user based on context data derived from aggregate digital communications and saves the resulting stress pattern data in a user profile database 111. It should be understood that a variety of methods may be utilized for determining stress patterns of a user in accordance with step 401. In aspects, sentiment analysis techniques are utilized to determine if digital communications include positive or negative content (e.g., detect the presence of negative or positive tones or phrases). In embodiments, the context module 110 may utilize NLP to parse text of digital communications into different keywords and sentence fragments in order to statistically relate words and/or phrases to certain context or "ideas", and determine whether content of the digital communications include negative tones or phrases or positive tones or phrases. In aspects, the context module 110 is configured to determine one or more topics (e.g., a person, a place or a thing) of a digital communication, the sender of the digital communication, and the recipient of the digital communication, and assign a sentiment rating to the digital communication, recipient, sender and/or topic based on positive or negative language of the digital communication. It should be understood that examples discussed above with respect to step 301 of FIG. 3 may be equally applicable to the client-based solution approach of step 401, and are therefore not repeated.

At step 402, the context module 110 generates a list of promotors and detractors based on the user stress patterns determined at step 401, and saves this information in the user profile database 111. It should be understood that examples discussed above with respect to step 302 of FIG. 3 may be equally applicable to the client-based solution approach of step 402, and are therefore not repeated.

In step 403, the scheduling module 113 of the user computer device 70C determines schedules of users based on digital communications and/or calendar data of the users. In embodiments, the communications server 60 has access to digital communications (e.g., email communications from the user of user computer device 70A) and/or calendar data (e.g., shared calendars) of one or more users (e.g., the users of user computer devices 70A and 70C). Various methods of determining schedules may be utilized in the implementation of step 403. For example, scheduling module 113 may access scheduling data from a calendar of a user, a work schedule of a user, aggregated email data of a user, or other sources of scheduling information. In aspects, the scheduling module 113 uses NLP to determine scheduling patterns in one or more types of aggregate digital communication data (e.g., email, instant messaging tools, text messages, etc.). For example, the scheduling module 113 may determine that Colleague A is usually on-site at a work location (e.g., office) between the hours of 8:30 PM Eastern Standard Time (EST) and 4:30 PM EST based on time data associated with a plurality of emails sent by the user from their user computer (e.g., user computer device 70A).

At step 404, the communication module 80C of the user computer device 70C receives a digital communication from a sender to one or more recipients (e.g., a user of user computer device 70C). Step 404 can be implemented utilizing a variety of digital communication methods and systems, such as email systems, instant messaging systems, text messaging systems, and the like.

At step 405, the delivery module 115 determines a total toxicity value of the digital communication received at step 404 by comparing digital communication data of the digital communication with user profile data of the recipient in the user profile database 111. In embodiments, the delivery module 115 uses NLP to parse the text of a digital communication, and analyses the digital communication for content (e.g., topics of the email). In aspects, the delivery module 115 compares content (e.g., topics, including people, places or things) of the digital communication with topics in the recipient's profile to determine whether any content of the digital communication is associated with toxicity values in the recipient's profile. It should be understood that examples discussed above with respect to step 305 of FIG. 3 may be equally applicable to the client-based solution approach of step 405, and are therefore not repeated.

At step 406, the delivery module 115 compares the total toxicity value of the digital communication of step 405 with a threshold value. The threshold value may be a predetermined threshold value set by a user, or may be a threshold value obtained from an outside source (e.g., communications server 60). The predetermined threshold value may be dynamic, and may increase or decrease from a base threshold value based on time of day, cumulative toxicity values of digital communications throughout the day, a current status of a user (e.g., the user's heartrate is already elevated based on wearable device data from the wearable device 92), or other factors affecting the user's ability to successfully process stressful information. A threshold value may be generic or may be customized for a particular user. If the delivery module 115 determines that the total toxicity value of the digital communications does not meet or exceed the threshold value at step 406, then the method proceeds to step 410, wherein the communication module 80C initiates delivery of the digital communication according to standard delivery procedures (i.e. delivery is not delayed). In the context of FIG. 4, delivery of a digital communication may constitute making the digital communication available to the user. For example, a digital communication received by the communication module 80C may not be shown in a user's email inbox until "delivered" by the delivery module 115. If the delivery module 115 determines that the total toxicity value of the digital communications meets or exceeds the threshold value at step 406, then the method progresses to step 407.

At step 407, the delivery module 115 determines whether special delivery procedures apply if the digital communication meets or exceeds the threshold value at step 406. In embodiments, the delivery module 115 compares digital communication data (e.g., sender of email, recipient of email, topic of email), the total toxicity value, and/or one or more toxicity values associated with the digital communication to rules in the user profile database 111. In aspects, one or more rules may be established by a user through a user interface of a user computer device (e.g., user computer device 70A). Rules may be established with respect to the recipient or sender of a digital communication. In aspects, a client application running on the user computer device 70C may enable different users to obtain different authorizations or permissions to establish rules.

Still referring to step 407 of FIG. 4, in one example, a sender Colleague B has the highest authority to dictate rules (e.g., administrator, manager, etc.) and sets up a rule that email communications from them should never be delayed, but should be delivered immediately per standard email procedures. In this example, the delivery module 115 may determine that a digital communication from Colleague B to Colleague A meets a threshold value for toxicity at step 406, but that the digital communication includes metadata or other content indicating that emails from the sender Colleague B should always be displayed to a recipient without delay, thus overriding the toxicity determined at step 406. In another example, a user may set up a rule that email communications from another user identified as a detractor of the user should always be displayed immediately per standard email procedures, and should never be delayed.

With continued reference to step 407 of FIG. 4, when the delivery module 115 determines that a rule supersedes a toxicity value (e.g., overrides the delay function of delivery module 115), the delivery module 115 proceeds to step 410, wherein the communication module 80C initiates delivery of the digital communication (i.e., the digital communication is available for viewing by the user) according to standard delivery procedures. If the delivery module 115 determines that no rules in the user profile database 111 and/or rules indicated in the digital communication data (e.g., metadata indicating a rule) supersede the toxicity value (e.g., no rules are identified that override the delay function of the delivery module 115), then the delivery module 115 proceeds to step 408.

At step 408, the delivery module 115 determines a schedule of one or more promotors associated with the recipient when the digital communication has met the threshold value at step 406, and no rules are identified that override the scheduling/delay function of the delivery module 115 in accordance with step 407. In embodiments, the delivery module 115 accesses scheduling data in the user profile database 111 generated at step 403 by the scheduling module 113. In aspects, the scheduling data can be determined dynamically, based on continuously updated scheduling information saved in the user profile database 111 at step 403. In embodiments, the delivery module 115 performs an availability confirmation step to determine whether the promotor associated with the user is available, such as by determining if they have performed a digital communication operation (e.g., sent email, opened email, deleted email) within a predetermined time frame (e.g., within the last 10 minutes). In aspects, step 403 is performed in conjunction with step 408, and the scheduling module 113 is integrated with the delivery module 115.

At step 409, the delivery module 115 determines a delivery time or delivery window for delivering the digital communication to the recipient based on the availability of the one or more promotors in view of their schedules determined at step 408. Availability of the promotor may be determined based on general availability (e.g., the promotor is in his/her office, the promotors schedule indicates they should be free, etc.) or based on the promotor's availability with respect the recipient of the digital communication (e.g., the promotor is currently online in a social media network or messaging tool accessible by the recipient). In embodiments, the delivery time determined by the delivery module 115 is a delayed delivery time which is later than a standard delivery time.

At step 410, the delivery module 115 generates and initiates delivery of a notification of delay to the sender of the digital communication through the communication module 80C, wherein the notification indicates that the delivery of the sender's digital communication will be delayed (when applicable). For example, the delivery module 115 may generate a notification to a sender telling the sender that their digital communication is scheduled to be delivered or made available to a recipient user at 3:00 PM, which constitutes a 1-hour delay in delivery from the standard delivery time. In embodiments, the delivery module 115 generates a notification in accordance with saved notification rules, which may be established by digital communication senders, digital communication receivers or administrators (e.g., organizations).

In embodiments, at step 411, the communication module 80C receives an override notification from the sender of the digital communication. In aspects, the override notification may be in response to the notification of delay delivered in accordance with step 410. By way of example, an Colleague B may receive a notification of delayed delivery in accordance with step 410, and in response, may select an option to override the delayed delivery. In aspects, the ability of a user to override the delayed delivery function of the present invention may be controlled by permissions determined by an administrator. Upon receipt of an override notification from the sender at user computer device 70C, the method proceeds to step 407, wherein the delivery module 115 determines that special delivery procedures apply, and causes the communication module 80C to initiate delivery of the digital communication without delay. In embodiments the communication module 80C and the delivery module 115 are integrated.

At step 412, the delivery module 115 initiates delivery of the digital communication to the recipient. If the total toxicity value of the digital communication does not meet a threshold value at step 406, or the delivery module 115 determines that a rules overrides the delay function of the delivery module 115 at step 407, then the digital communication is delivered to the recipient in accordance with standard delivery procedures based on a standard delivery time (e.g., an email is displayed in the user's in-box, or the instant message appears in an instant messaging window). However, if the total toxicity value of the digital communication meets a threshold value at step 406, and no overriding rules apply in accordance with step 407, then the delivery module 115 causes the digital communications to be delivered to the recipient based on the delivery time or window determined at step 409. In embodiments, the delivery module 115 causes the digital communication to be delivered based on a delayed delivery time (e.g., delayed 3 hours until a promotor of the recipient is available).

Embodiments of the invention may be implemented utilizing a centralized system (e.g., communications server 60). In aspects, a user/business may configure a delayed delivery function in their messaging systems to be enabled or disabled, or enabled/disabled in accordance with established rules to address different circumstances (e.g., enable a delayed delivery function for "stressful" messages for recipients who are determined to be susceptible to stress). In embodiments, a user/business may specify organizational and social network data sources for use in the steps of FIG. 3 or 4. In aspects, a user may be notified of the preferences/rules that are set when composing or sending a message (e.g., sender receives a notification that the digital communication will not arrive at the recipient computer device before a "support network" is available to the recipient). Optionally, the recipient may be presented with an option to set a To-Do or follow-up task at the appropriate or preferred time to respond to a digital communication delayed in accordance with embodiments of the invention.

It should be understood that rules discussed herein may be established by users (e.g., administrator for a corporation) regarding a length of time for a window of delay for one or more groups of users. For example, a rule may establish a minimum amount of time a window is open, based on a targeted user population. Alternatively, a rule may establish a maximum amount of time a window may be open based on a targeted user population. A rule (e.g., corporate policy setting) may also be shared with sub-classes of users based on geography (e.g., location of user), divisions of users, teams associated with individual users, projects in which users are involved, social networks of the individual users, etc. In aspects, there may be a hierarchy specified for any decision making by the user computer devices 70A-70C or communications server 60 behind the settings/rules if more than one class of user specifies a set of settings/rules. Corporate and associated subclass settings/rules may apply to a user who sets them or a user for whom the settings/rules are applied.

In embodiments, suspensions of settings/rules and/or total blocking of settings/rules are supported, wherein if a user does not wish to throttle incoming electronic content, rather than revise user profile settings, the user can elect to suspend any delayed delivery and receive all digital communications in accordance with standard delivery procedures. Similarly, when a non-interruptible meeting or task is scheduled, a user may override temporarily the current delivery settings of in the user's profile and block all incoming deliveries of digital communications. When override settings are applied and a delivery module (e.g., 95, 115) determines a delivery time that differs from what a sender was told (e.g., the delivery time differs from a notification sent in accordance with step 312 of FIG. 3) a return receipt notification may be generated by the communications module (e.g., 94, 80C) to alert the sender of the digital communication as to when the digital communication was received by the recipient. In embodiments, a sender of a digital communication may elect to view delivery window options (based on time range of settings the recipient has selected) and select from the delivery window options (e.g., "select an option don't delivery this tomorrow", or "send in two days at the next specified 'support network' window opening", etc.).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for selectively delaying the delivery of stress-inducing digital communications. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a computing device, notification of a digital communication from a sender to at least one recipient;
   determining, by the computing device, a toxicity value of the digital communication by comparing data of the digital communication with user profile data of the at least one recipient;
   determining, by the computing device, that the toxicity value meets a predetermined threshold value associated with the at least one recipient, indicating that toxic communication handling procedures apply to selectively delay the delivery of the digital communication to the at least one recipient;
   determining, by the computing device, whether special delivery procedures apply that override the toxic communication handling procedures; and
   initiating, by the computing device, delivery of the digital communication to the at least one recipient based on the determining whether special delivery procedures apply.

2. The method of claim 1, wherein:
   the determining whether special delivery procedures apply comprises determining that special delivery procedures do apply; and
   the initiating the delivery of the digital communication comprises initiating the delivery of the digital communication to the at least one recipient without selectively delaying the delivery of the digital communication to the at least one recipient.

3. The method of claim 1, wherein the determining whether special delivery procedures apply comprises determining that special delivery procedures do not apply, the method further comprising:
   determining, by the computing device, a schedule of one or more promotors associated with the at least one recipient;
   determining, by the computing device, a delayed delivery time for delivering the digital communication to the at least one recipient based on the schedule of the one or more promotors associated with the at least one recipient; and
   initiating, by the computing device, delivery of the digital communication to the at least one recipient based on the delayed delivery time.

4. The method of claim 3, further comprising initiating, by the computing device, a delivery of a notification to the sender that the delivery of the digital communication is subject to a delay.

5. The method of claim 3, wherein the at least one recipient comprises multiple recipients, and wherein the determining the delayed delivery time for delivering the digital communication comprises:
   determining, by the computing device, a delay time for each of the multiple recipients based on the schedule of the one or more promotors associated with each of the multiple recipients, whereby multiple possible delay times are determined; and
   choosing, by the computing device, one of the multiple possible delay times as the delayed delivery time based on one or more arbitration rules.

6. The method of claim 1, further comprising:
   receiving, by a computing device, the user profile data of the at least one recipient and storing the user profile data in a user profile database;
   determining, by the computing device, stress patterns of the at least one recipient based on context data derived from aggregate digital communications of the at least one recipient;
   generating, by the computing device, a list of promotors and distractors based on the stress patterns of the at least one recipient; and
   saving, by the computing device, the list of promotors and distractors in the user profile database.

7. The method of claim 1, further comprising determining, by the computing device, schedules of a plurality of users based on aggregate digital communications data and calendar data of the plurality of users, and saving the schedules in a user profile database.

8. The method of claim 1, wherein the determining the toxicity value of the digital communication comprises utilize natural language processing to parse text of the digital communications into different keywords and sentence fragments in order to statistically relate words or phrases to certain context, and determine a presence of negative tones, negative phrases, positive tones or positive phrases.

9. A computer program product for selectively delaying delivery of stress-inducing digital communications, the computer program product comprising a computer readable storage device having program instructions embodied therewith, the program instructions executable by a computing device to cause the computing device to:
   receive a notification of a digital communication from a sender to a recipient;
   determine a toxicity value of the digital communication by comparing data of the digital communication with stress pattern data in a user profile of the recipient, wherein the stress pattern data is indicative of content determined to statistically increase a stress level of the recipient;
   determine that the toxicity value meets a predetermined threshold value associated with the recipient, indicating that toxic communication handling procedures apply to selectively delay the delivery of the digital communication to the recipient; and
   initiating delivery of the digital communication to the recipient in accordance with the toxic communication handling procedures based on a delayed delivery time.

10. The computer program product of claim 9, wherein the program instructions further cause the computing device to:
   determine a schedule of one or more promotors associated with the recipient; and
   determine the delayed delivery time for delivering the digital communication to the recipient based on the schedule of the one or more promotors associated with the recipient.

11. The computer program product of claim 9, wherein the program instructions further cause the computing device to initiate delivery of a notification to the sender that the delivery of the digital communication is subject to a delay.

12. The computer program product of claim 9, wherein the program instructions further cause the computing device to:
   receive user profile data of the recipient and storing the user profile data in the user profile;
   determine stress patterns of the recipient based on context data derived from aggregate digital communications of the recipient;
   generate a list of promotors and distractors based on the stress patterns of the recipient; and
   save the list of promotors and distractors in the user profile.

13. The computer program product of claim 9, wherein the program instructions further cause the computing device to determine schedules of a plurality of users based on aggregate digital communications data and calendar data of the plurality of users, and saving the schedules in a user profile database.

14. The computer program product of claim 9, wherein the determining the toxicity value of the digital communication comprises utilize natural language processing to parse text of the digital communications into different keywords and sentence fragments in order to statistically relate words or phrases to certain context, and determine a presence of negative tones, negative phrases, positive tones, or positive phrases.

15. A system for selectively delaying delivery of stress-inducing digital communications, comprising:
   a CPU, a computer readable memory and a computer readable storage medium associated with a computing device;
   program instructions to receive a digital communication from a sender to a recipient;
   program instructions to determine a toxicity value of the digital communication by comparing data of the digital communication with user profile data of the recipient;
   program instructions to determine that the toxicity value meets a predetermined threshold value associated with the recipient, indicating that toxic communication handling procedures apply to selectively delay the delivery of the digital communication to the recipient;

program instructions to determine whether special delivery procedures apply that override the toxic communication handling procedures based on the user profile data of the recipient; and program instructions to make the digital communication available for viewing by the recipient based on the determining whether special deliver procedures apply, wherein the program instructions are stored on the computer readable storage medium for execution by the CPU via the computer readable memory.

16. The system of claim 15, wherein, when the program instructions determine that special delivery procedures do apply, the digital communication is made available for viewing by the recipient without selectively delaying the delivery of the digital communication to the recipient.

17. The system of claim 15, further comprising:
program instructions to determine a schedule of one or more promotors associated with the recipient;
program instructions to determine a delayed delivery time for delivering the digital communication to the recipient based on the schedule of the one or more promotors associated with the recipient; and
program instructions to make the digital communication available for viewing by the recipient based on the delayed delivery time when the program instructions determine that special delivery procedures do not apply.

18. The system of claim 15, further comprising program instructions to initiate delivery of a notification to the sender that the delivery of the digital communication is subject to a delay.

19. The system of claim 15, further comprising:
program instructions to generate the user profile data of the recipient and storing the user profile data in a user profile database;
program instructions to determine stress patterns of the recipient based on context data derived from aggregate digital communications of the recipient;
program instructions to generate a list of promotors and distractors based on the stress patterns of the recipient; and
program instructions to save the list of promotors and distractors in the user profile database.

20. The system of claim 15, further comprising program instructions to determine schedules of a plurality of users based on aggregate digital communications data and calendar data of the plurality of users, and save the schedules in a user profile database.

* * * * *